United States Patent
Mara et al.

(10) Patent No.: US 12,041,123 B2
(45) Date of Patent: *Jul. 16, 2024

(54) PEER-TO-PEER DATA COMMUNICATION BETWEEN DIFFERENT APPLICATIONS

(71) Applicant: VMWare LLC, Palo Alto, CA (US)

(72) Inventors: Jayaprakash Mara, Atlanta, GA (US); Xinpi Du, Atlanta, GA (US); Sophat Nouv, Atlanta, GA (US); Ravi Sarma, Atlanta, GA (US); Ali Mohsin, Atlanta, GA (US)

(73) Assignee: VMware LLC, Palo Alto, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/339,331

(22) Filed: Jun. 4, 2021

(65) Prior Publication Data

US 2021/0297479 A1 Sep. 23, 2021

Related U.S. Application Data

(63) Continuation of application No. 16/895,877, filed on Jun. 8, 2020, now Pat. No. 11,032,363, which is a continuation of application No. 15/969,188, filed on May 2, 2018, now Pat. No. 10,678,606.

(51) Int. Cl.
| | |
|---|---|
| *H04L 29/08* | (2006.01) |
| *G06F 9/52* | (2006.01) |
| *G06F 9/54* | (2006.01) |
| *H04L 67/104* | (2022.01) |
| *H04L 67/1095* | (2022.01) |

(52) U.S. Cl.
CPC .............. *H04L 67/104* (2013.01); *G06F 9/52* (2013.01); *G06F 9/541* (2013.01); *H04L 67/1095* (2013.01)

(58) Field of Classification Search
CPC ..... H04L 67/104; H04L 67/1095; G06F 9/52; G06F 9/541
See application file for complete search history.

(56) References Cited

U.S. PATENT DOCUMENTS

| | | | |
|---|---|---|---|
| 9,973,374 B1 * | 5/2018 | Ratias | H04W 12/068 |
| 2008/0005195 A1 * | 1/2008 | Li | G06F 16/1837 707/999.203 |

OTHER PUBLICATIONS

Iiro Krankka, "It's Time to kiss goodbye to your implicit BroadcastReceivers", Mar. 21, 2017, Codemate Blog (Year: 2017).*

(Continued)

*Primary Examiner* — Jacob D Dascomb
(74) *Attorney, Agent, or Firm* — Kim & Stewart LLP

(57) ABSTRACT

Examples described herein include systems and methods for synchronizing applications that target different software development kits ("SDK"). The system can execute a bridge application that registers an implementation of a content provider class. This allows the bridge application to communicate with a first application targeting a first SDK. The bridge application can also register to send and receive implicit broadcasts. After the bridge application verifies the request, it can broadcast to a second cluster of applications registered with an operating system to receive implicit broadcasts. Similarly, the bridge application can receive implicit broadcasts and synchronize those requests with a first cluster of applications by using the implemented content provider methods.

20 Claims, 8 Drawing Sheets

(56) References Cited

OTHER PUBLICATIONS

Späth, P. (2018). Broadcasts. In: Pro Android with Kotlin. Apress, Berkeley, CA (Year: 2018).*
Krankka, Iiro, "It's Time to Kiss Goodbye to Your Implicit Broadcast Receivers", Codemate Blog, Mar. 2017.

* cited by examiner

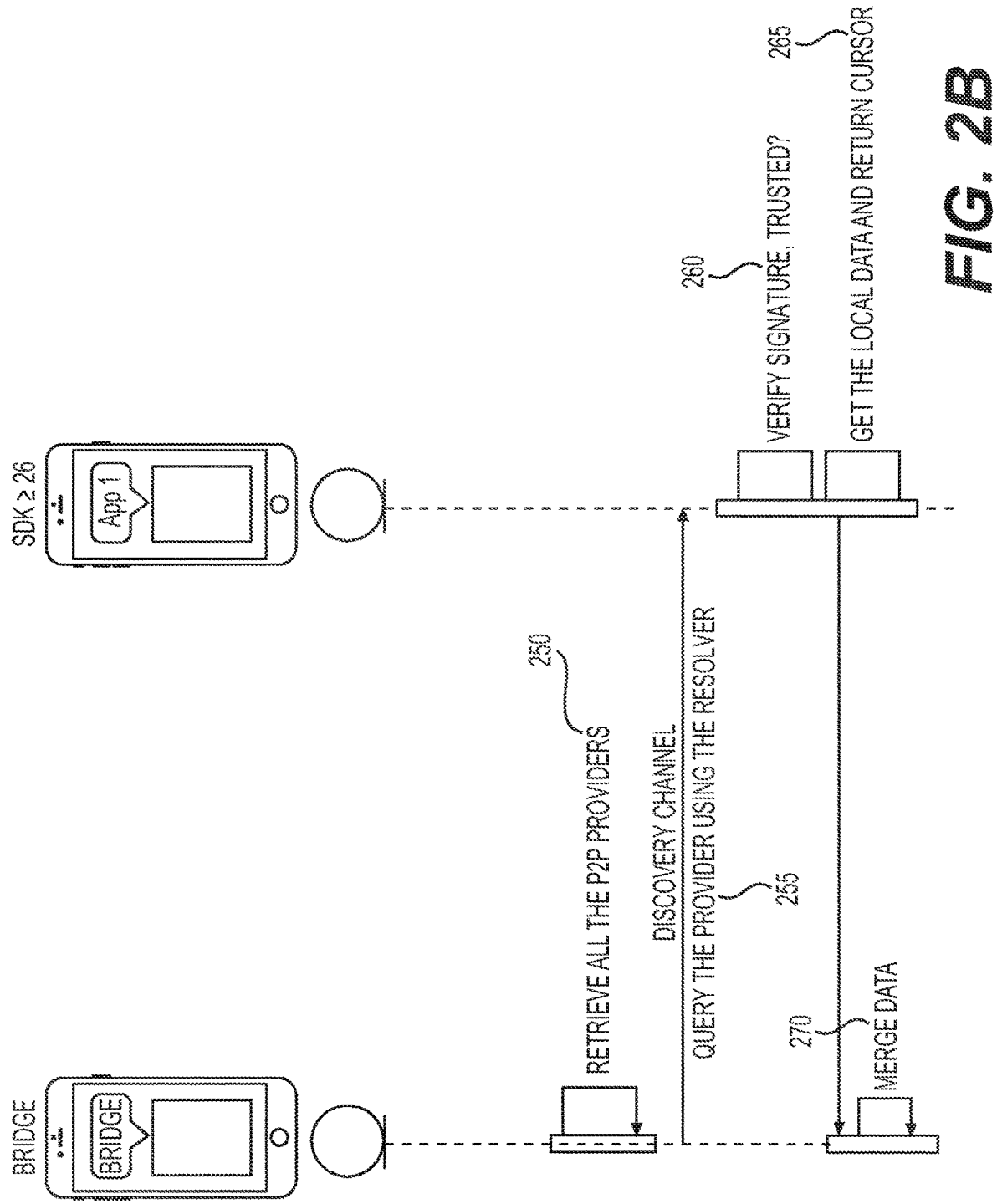

PEER-TO-PEER DATA COMMUNICATION BETWEEN DIFFERENT APPLICATIONS

This application claims priority as a continuation of U.S. patent application Ser. No. 16/895,877, entitled "Peer-to-peer Data Communication Between Different Applications," filed Jun. 8, 2020, which is a continuation of U.S. patent application Ser. No. 15/969,188, entitled "Peer-to-peer Data Communication Between Different Applications," filed May 2, 2018, both of which are incorporated by reference herein in their entireties.

BACKGROUND

Applications on a user device, such as a laptop, commonly communicate with one another to synchronize information. This is particularly true for applications in a Mobile Device Management ("MDM") or Enterprise Mobility Management ("EMM") system. In those systems, providers can allow employees to access multiple different applications based on a single user authentication, and actions in one application can impact functionality in another. For single-sign-on ("SSO") and other management features to function correctly, applications on the user device need to synchronize information amongst themselves.

ANDROID applications have commonly used implicit broadcasts for data synchronization. A first application can broadcast a request that is received by all other applications that have registered with the operation system ("OS") to receive the broadcasts. The receiving applications respond to those requests, such as push and pull requests, to send and receive data updates.

However, newer OS versions and software development kits ("SDK") can prevent applications from registering with the OS to receive implicit broadcasts. For example, ANDROID 8.0 SDK 26 and above disallows registering receivers for implicit broadcasts. An application that does not register a broadcast receiver will not receive an implicit broadcast sent by another application.

This can break synchronization of applications on the user device. For example, for ANDROID 8.0 and higher, first applications that target a first SDK (26 or greater) will not receive implicit broadcasts from second applications targeting a second SDK (25 or lower). The first applications can use some other protocol to synchronize amongst themselves, but this still creates a backwards compatibility issue. Two application clusters targeting different SDKs will only synchronize amongst themselves and not with each other.

As a result, a need exists for systems and methods for synchronizing states between clusters of applications that target different SDKs.

SUMMARY

Examples described herein include systems and methods for peer-to-peer synchronization between applications targeting different SDKs. A bridge application can execute on a processor of a device, such as a laptop, tablet, phone, or computer. The bridge application can register a peer-to-peer ("P2P") provider with the OS. The P2P provider can implement content provider, which can be a class available for the ANDROID operating system in an example, to use the content provider methods for P2P synchronization purposes. For example, an update method can act as a push and a query method can act as a pull. The content provider methods can be used for synchronization by a first application targeting a first SDK, such as SDK 26 or later for ANDROID. The first SDK disallows registration of a receiver with the OS for receiving implicit broadcasts.

However, the bridge application can also register, with the OS, a receiver that receives implicit broadcasts. Implicit broadcasts can be used to synchronize data with various requests for a second application. The second application can target a second SDK, such as SDK 25 or below for ANDROID.

The bridge application can receive a request from the first application. The request can be received by the P2P provider registered by the bridge application. The request can be a push or pull request, in the form of an update or query.

The bridge application can verify a signature of the request prior to performing the update or query. The signature can exist as a key that is provided in a P2P channel used by content provider. The channel can be specifically implemented by the P2P provider. The signature can be compared against a whitelist of recognized signatures or checked against keys that form a potential key pair. Other verification can also include checking a channel ID and other aspects of the request itself, such as a name and address of a P2P provider that sent the request. These verification steps can be performed by the bridge application's P2P provider, in an example.

In addition to verification, the bridge application can check that the request is non-redundant. This can involve comparing a time stamp of the request against time stamps of local data or of other requests the bridge application has received. If the request is non-redundant, the bridge application can perform the request on its own local data. For example, the bridge application can update data in response to a push or return data to the first application in response to a pull.

If the request is verified and non-redundant, the bridge application can also synchronize the request by broadcasting to a second application. The second application can receive the broadcast by preregistering a receiver with the OS. The second application targets an SDK that allows registration to receive implicit broadcasts. By doing this, the bridge application can allow first and second application clusters to synchronize between each other, even when each cluster targets different SDKs and uses different protocols to synchronize.

These stages can be performed as part of a computer-implemented method. Alternatively, they can execute in a device or system that retrieves instructions from memory for execution with a processor. These stages can be stored on a non-transitory, computer-readable medium for execution by a processor.

Both the foregoing general description and the following detailed description are exemplary and explanatory only and are not restrictive of the examples, as claimed.

BRIEF DESCRIPTION OF THE DRAWINGS

FIG. 2B is an exemplary flowchart for synchronization between applications implementing content provider.

DESCRIPTION OF THE EXAMPLES

Figure 1:
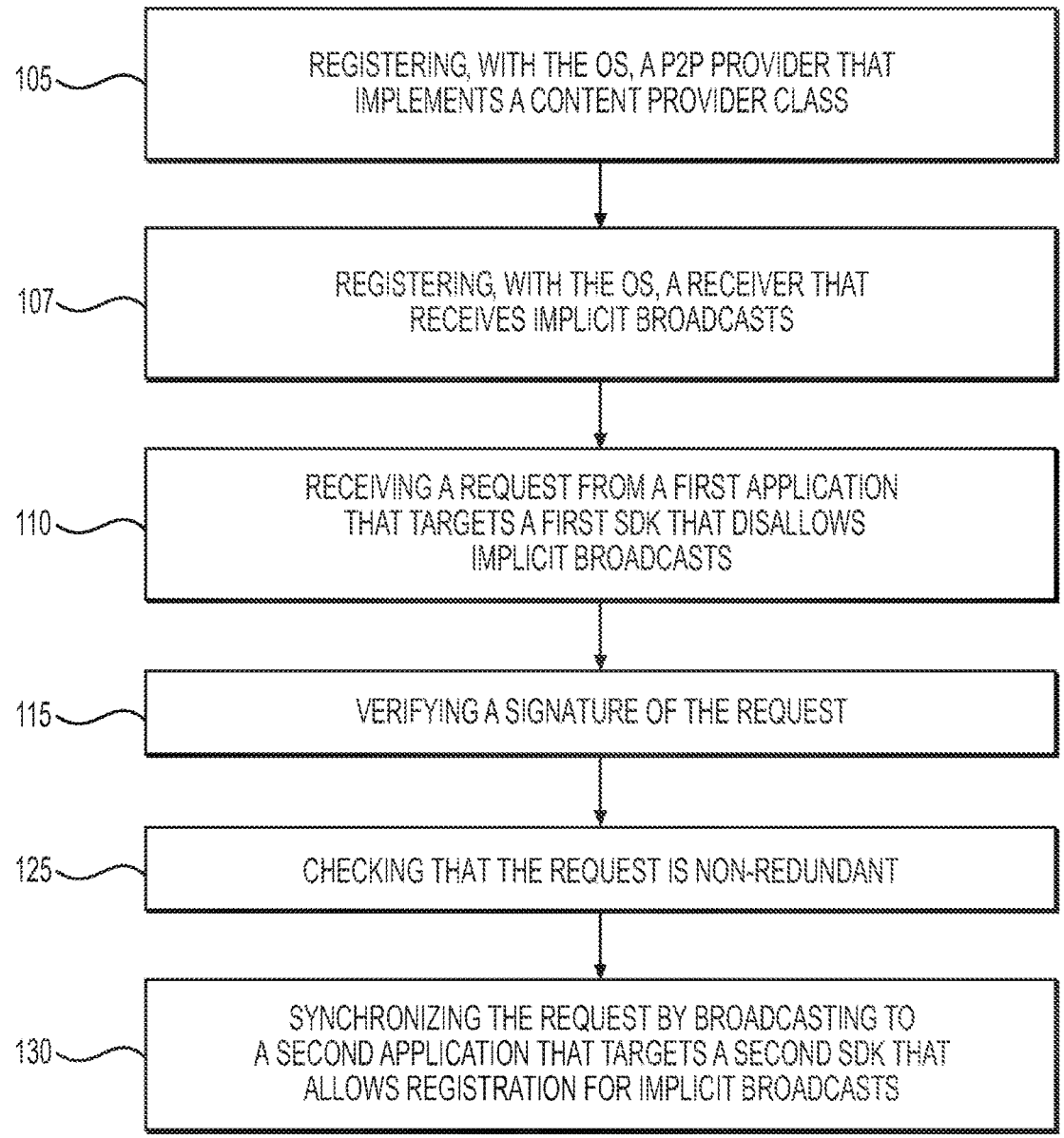
FIG. 1 is a flowchart of an exemplary method for managing firmware of a group of user devices associated with an enterprise.

Reference will now be made in detail to the present examples, including examples illustrated in the accompanying drawings. Wherever possible, the same reference numbers will be used throughout the drawings to refer to the same or like parts.

Examples described herein include systems and methods for P2P synchronization of applications that target different SDKs in an OS such as ANDROID. A user device, such as a tablet, phone, or computer, can include multiple applications that synchronize with one another. Synchronization can be important for application features that depend on events, status, or activity in another application. Applications also synchronize for security processes, such as SSO, password-based encryption ("PBE"), and other security or authentication processes.

To synchronize, ANDROID applications have commonly used implicit broadcasts as a background process. Applications register a receiver with the OS to receive the broadcasts. ANDROID SDK 25 and below allows for registering receivers to receive implicit broadcasts. However, in ANDROID 8.0, SDK 26 and above disallow registration to receive implicit broadcasts. This means applications that target newer SDK versions will not listen for implicit broadcasts and will not synchronize correctly with existing applications relying on implicit broadcasting. Even though applications targeting SDK 26 or higher can communicate with one another, they are not backwards compatible with applications targeting SDK 25 or lower, which rely on implicit broadcasts.

To solve this problem, bridge applications are introduced that can communicate with applications targeting different SDKs. This can allow for synchronization across applications groups. A first group of applications can target SDK 26 and above. These are typically newer applications. They can synchronize by using messaging in a content provider class rather than through implicit broadcasts. A second group of applications, typically legacy applications, can target SDK 25 and below. The second group of applications still relies on implicit broadcasts for synchronization.

The bridge application can compile SDK 26 or above but target SDK 25 or below. The bridge application can register with the OS both a receiver for implicit broadcasts and a P2P implementation of content provider. The latter is referred to as a P2P provider. The first application can make requests to any P2P implementation of content provider that is registered with the OS. By registering the P2P provider, the bridge application can receive those requests and can similarly make requests to other applications that implement content provider for P2P purposes, such as the first application.

The bridge application's P2P provider can receive the request from the first application. The P2P provider can then verify that it is valid before fulfilling the request. This can include comparing a signature of the request against a whitelist. For example, managed or enterprise applications can use common signatures when communicating with one another. The bridge application can also perform other channel specific actions, such as checking that SSO is enabled and the SDK is initialized.

After verification, the bridge application can synchronize the request by broadcasting it to a second application that targets SDK 25 or below. The second application can listen for implicit broadcasts. To further synchronize, the second application can rebroadcast the request to other applications registered to receive the broadcasts. This effectively allows for the transfer of data between the first and second applications even though they target different SDKs that cause implicit broadcast incompatibility.

FIG. 1 is an example method for P2P synchronization among first and second applications that target different SDKs. A bridge application executing on the user device can facilitate synchronization between the first and second applications. The first application can target an SDK that disallows registering for implicit broadcasts, such as ANDROID SDK 26 or higher. The first application instead communicates with other applications using a content provider class of ANDROID, in an example. The second application does not implement the content provider class, and instead relies on implicit broadcasts to communicate with other applications on the user device.

At stage 105, the bridge application can register a P2P provider with the OS. The P2P provider can implement the content provider class in a P2P context. The P2P provider can act as a transport layer to facilitate communications, such as update and query commands, on P2P channels. Using content provider, the P2P provider can send and receive information with other applications.

In one example, the bridge application registers the P2P provider at stage 105 by identifying the P2P provider as a receiver and provider in its manifest. An example manifest is shown below.

<receiver android:name="com.emm.sdk.p2p.P2PReceiver">
  <intent-filter>
    <action android:name="com.emm.sdk.p2p.P2PProvider"
</receiver>
<provider
  android:name="com.emm.sdk.p2p.P2PProvider"
  android:authorities=${applicationID}.p2p
  android:enabled="true"
  android:multiprocess="false"
  android:exported="true">
</provider>

Registering the P2P provider can enable communication with the first application. To synchronize, the first application can retrieve the registered P2P providers, including that of the bridge application, from the OS. Then the first application can send requests to the P2P providers.

At stage 107, the bridge application can also register with the OS to receive implicit broadcasts. This can enable the bridge application to send and receive communications with applications that use implicit broadcasts to synchronize, including the second application. The manifest can include a registration string that the SDK uses to register the broadcast receiver with the OS. When the second application sends a broadcast, the receiver registered for the bridge application can receive that broadcast.

To utilize both the P2P provider and broadcast receivers, the bridge application can compile SDK 26 or higher but target SDK 25 or lower. This configuration can be specified in the manifest of the bridge application. Compiling SDK 26 or higher can allow the bridge application and first application to securely communicate using the P2P provider registered in stage 105. However, by targeting SDK 25 or lower, the bridge application can also still receive implicit broadcasts based on the registration of stage 107. As a result, the bridge application can communicate with both the second application, which relies on implicit broadcasts, and the first application, which communicates using the P2P provider's implementation of content provider. Receiving both communication types can allow the bridge application to bridge synchronization between clusters of old applications and clusters of new applications.

At stage 110, the bridge application can receive a request at the P2P provider from a first application that targets a first SDK that does not allow implicit broadcasts. The request can be a push or a pull request. Content provider includes an update command that can be implemented as the push request. The update can cause the bridge application to write data to a resource, such as a table of a database. Similarly, a query command in content provider can act as a pull request. The query can cause the bridge application to return data.

The P2P provider can specify which content provider channels are used in the requests. For example, the content provider command can be sent on a first channel, and a signature (such as a key) can be sent on another channel.

At stage 115, the bridge application can verify that the request should be synchronized by verifying a signature of the request. Because untrusted applications can also communicate using content provider, the verification at stage 115 can be used to ensure that the request is coming from a recognized application. This can prevent synchronization from breaking based on communications from unrelated applications or from malicious applications.

The verification can include checking a signature that is included with the request. The signature can be an authority string that identifies the P2P provider of the first application. The P2P provider of the bridge application can verify that it should synchronize with the first application. To do this, the signature can be compared against a whitelist, in an example. The signature can be specific to applications trusted by an enterprise or EMM provider. For example, managed applications for a EMM provider can have known signatures that are included in the whitelist stored at the bridge application or its registered P2P provider. A management server can update the whitelist (at the bridge application or P2P provider) to manage which applications can synchronize with one another.

In one example, the first application includes a key as the signature. The key can be provided in one of seven content provider channels. The bridge application can verify the key by determining that the correct channel is used and that the bridge application or P2P provider has a valid key pair. The EMM provider can configure the bridge application or P2P provider to recognize multiple signatures and synchronize amongst multiple defined groups of applications, including the first application.

In one example, verifying the signature can be performed after other less time-intensive verification steps. The P2P provider can be configured to perform the signature check last in case a simpler verification shows a request should be ignored. For example, the bridge application can first check for a uniform resource information ("URI") match, then a channel ID match, and then a signature match.

In one example, the URI can identify the channel and the request. Alternatively, the URI can be a string of characters that identifies the P2P provider and a resource to update or request. For example, the URI can include identification of an individual row in a table. Data access methods of content provider can have a content URI as an argument, allowing the bridge application or other application receiving the request to determine the table, row, or file to access. If the URI is different than expected by the bridge application, the bridge application can decline synchronization.

The channel ID can identify which channel or channels the first application is attempting to communicate over. In one example, the channel ID is part of the URI. The content provider class can include seven different channels. If the first application is not communicating on a channel expected by the bridge application, the bridge application can decline synchronization.

At stage 125, the bridge application can determine that the request is non-redundant. In one example, the bridge application can do this by checking a request identifier and a request date. The request identifier can be specific to the application sending the request or can be specific to the request itself. For example, the request identifier can include the URI, channel ID, and signature. The request date can indicate when the request was sent. The bridge application can check a history of requests to determine if it has received the same request identifier with an earlier date. If so, the bridge application can ignore the request as redundant.

Otherwise, at stage 130, the bridge application can synchronize the request by broadcasting to the second application using an implicit broadcast. If the request is a push, then the bridge application can broadcast the push out to the second application and other applications that are listening for implicit broadcasts. If the request is a pull, then the bridge application can broadcast a pull request to the first application and receive back data for forwarding to the first application. In this way, the bridge application can push or pull data from both first and second applications that target different SDKs and cannot directly synchronize.

Figure 2A:
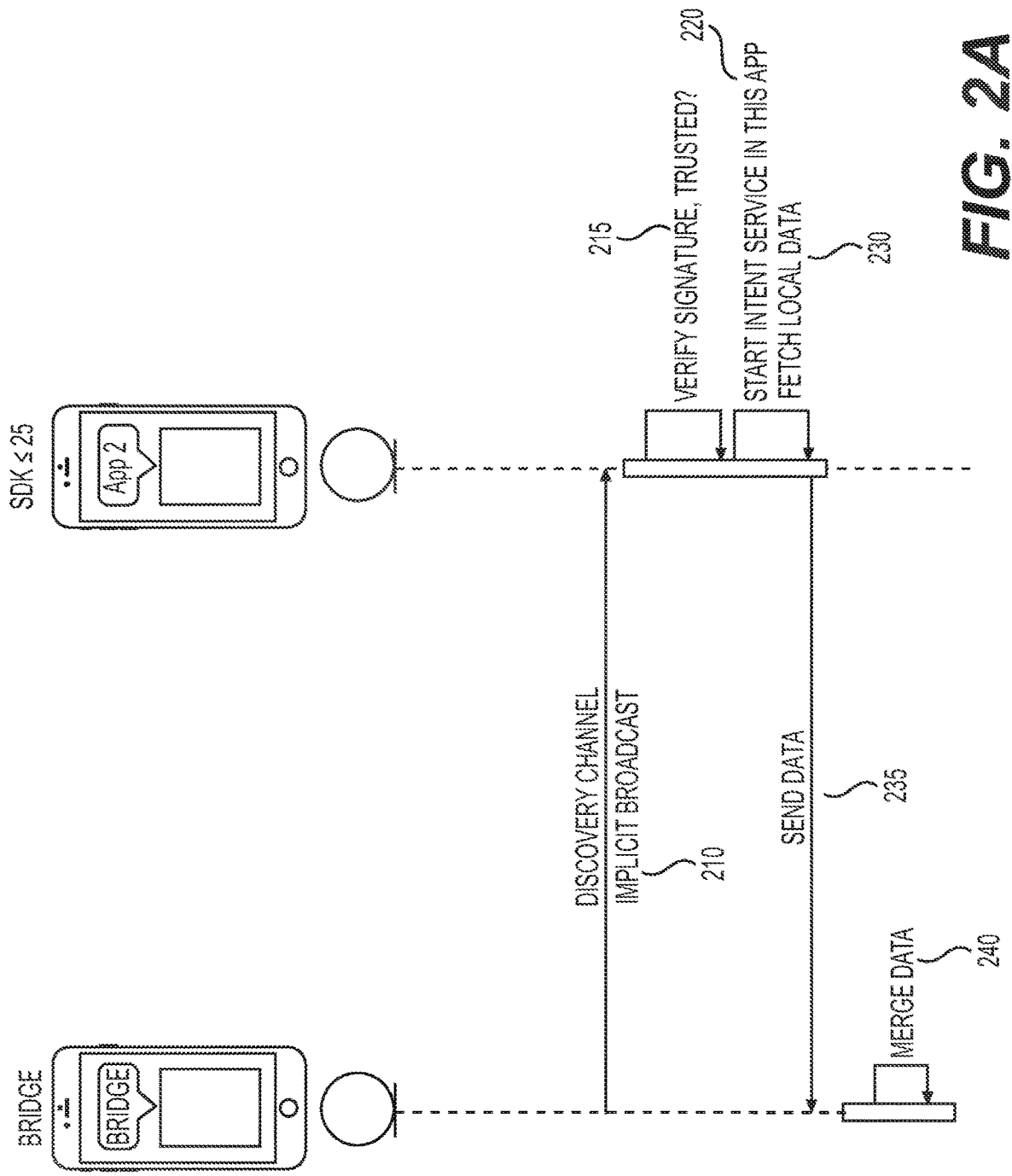
FIG. 2A is a flowchart for synchronization between applications using implicit broadcasts.

FIG. 2A is a flowchart that illustrates steps involved with an implicit broadcast. A bridge application can broadcast a pull operation to synchronize with applications targeting SDK 25 and lower. Applications that have registered to receive implicit broadcasts can receive the broadcast and send data to the bridge application. Although FIG. 2A shows example stages between the bridge application and the second application (APP 2), these stages can apply to any two applications capable of using implicit broadcasts to synchronize.

At stage 210, the bridge application can make an implicit broadcast on the discovery channel. The broadcast can include a pull request and can contain the communication information. This can allow registered applications to receive the broadcast. The OS can track which applications have registered to receive implicit broadcasts. The OS can also route the broadcasts to those applications or provide the bridge application with an address to use.

In one example, a first application that targets an incompatible SDK cannot receive the broadcast. For example, if the first application targets ANDROID 8 SDK 26 or higher, it cannot register a receiver with the OS. Therefore, the broadcast of stage 210 will not be sent to the first application. Instead, the bridge application can use a P2P implementation of content provider, in an example. This can include registering a P2P provider in the bridge application. The P2P provider can implement content provider and use its methods in a P2P synchronization context. This approach is compatible with ANDROID 8 SDK 26 and will be discussed later regarding FIG. 2B.

Continuing with FIG. 2A, at stage 215, the second application, having registered with the SDK to receive implicit broadcasts, receives the pull request. But before performing the pull, the second application can verify the request. This can include verifying a signature, such as a string or other key included with the request, against a whitelist. It can also include other verifications, as will be discussed with regard to FIGS. 4A and 4B.

After verification, at stage 220 the second application can start up an intent service to process the request. In ANDROID, an intent is a specific action. The second application can start an intent service to resolve the pull request by fetching local data at stage 230. For example, the intent service can retrieve data from a table.

At stage 235, the second application can send data back to the bridge application. The bridge application can determine if the data should be merged with the local data. For example, the bridge application can determine if the data is newer than existing data at the bridge application. If so, at stage 240, the bridge application can merge the data sent through the intent with the local data existing at the bridge application.

However, the first application, which targets SDK 26 or higher, cannot communicate using implicit broadcasts in this manner. Instead, the bridge application can issue a pull request through use of the P2P provider, as shown in FIG. 2B.

FIG. 2B illustrates exemplary stages for sending a pull request using P2P providers, which can be P2P implementations of content provider. Although this example shows a bridge application making a push request to a first application, the stages can apply to any two applications utilizing a P2P implementation of content provider for synchronization purposes.

At stage 250, the bridge application can retrieve available P2P providers. The OS returns the names and addresses of other applications that have implemented the P2P protocol on top of content provider. In one example, the OS identifies the P2P providers associated with those applications. As is the case with the bridge application, other applications can register a P2P provider with the OS by identifying the P2P provider in a manifest. This can allow the OS to identify the P2P providers to the bridge application.

The OS can identify the P2P provider of the first application. The first application can include a manifest that registers its P2P provider with the OS. That can allow the bridge application to retrieve that P2P provider in stage 250.

At stage 255, the bridge application can send the pull request by issuing a query command to the P2P provider of the first application. The query command can be an implemented method of content provider. Rather than sending a broadcast to registered receivers, as done in stage 210 of FIG. 2A, applications targeting SDK 26 and higher can rely on content provider methods to either query or update other applications. In one example, content resolver can provide access to the P2P provider of the first application. The content resolver can direct the bridge application's request to the P2P provider without knowing the implementation of content provider it is interacting with. The URI can specify the P2P provider of the first application. The content resolver can be based on the content resolver class in ANDROID, which is part of ANDROID's content package.

At stage 260, the first application can verify that the request from the bridge application is trusted. This can include verifying a signature. It can also include other verifications, such as verifying that the channel ID and URI are recognized by the P2P provider.

At stage 265, the first application can retrieve the data requested by the query from the bridge application. This can include retrieving a file or data from a table in a database. The first application can return a cursor to the retrieved data that allows the bridge application to access that data. Then, at stage 270, the bridge application can merge the data with its own.

Figure 3A:
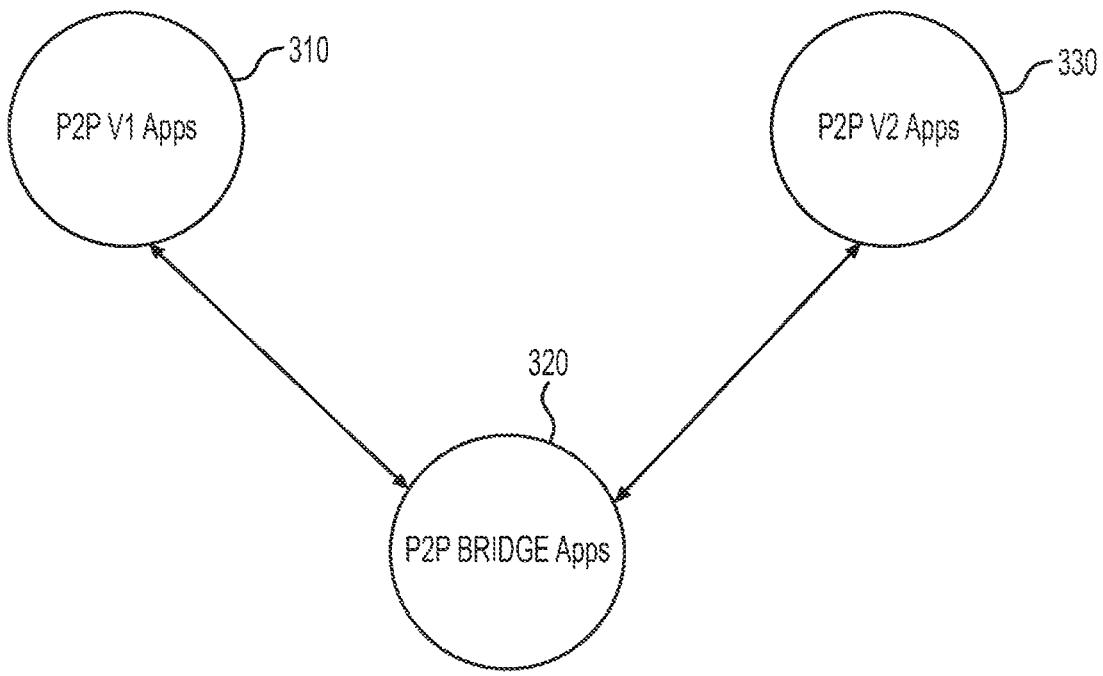
FIG. 3A is an exemplary illustration of synchronization between application clusters.

FIGS. 3A-3D illustrate examples of how bridge applications can be used to facilitate synchronization between clusters of applications that target different SDKs. FIG. 3A illustrates a first cluster 310 of applications that utilize a first version of P2P synchronization, and a second cluster 330 that utilizes a second version of P2P synchronization. The first version can rely on implicit broadcasts. For example, the first cluster 310 of applications can all target SDK 25 or below. The second version of P2P synchronization can be based on a P2P implementation of content provider. For example, the second cluster 330 of applications can all target SDK 26 or above.

As shown in FIG. 3A, these two clusters 310 and 330 cannot directly synchronize with each other. Instead, they are both able to communicate with a bridge cluster 320, which can contain multiple bridge applications. The bridge applications can compile SDK 26 or higher and target SDK 25 or lower. The bridge applications can therefore register to listen for implicit broadcasts from the first cluster 310. However, compiling the newer SDK can also allow the bridge applications to register a P2P provider and make and receive content provider commands to interact with the second cluster 330.

Figure 3B:
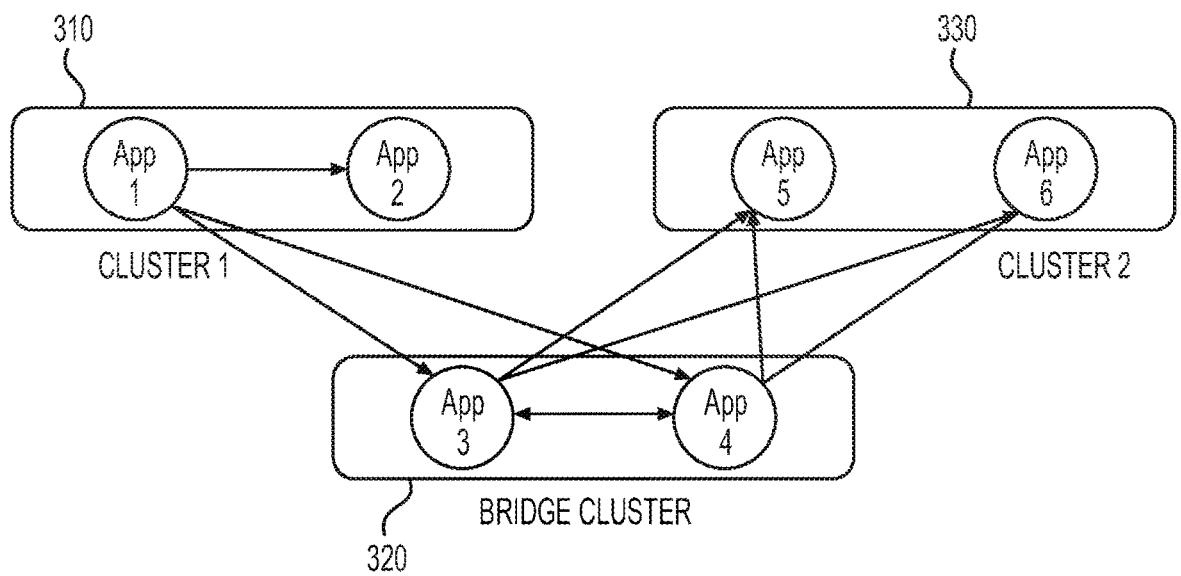
FIG. 3B is an exemplary illustration of synchronization between application clusters.

FIG. 3B is an example illustration showing synchronization of a push request. In this example, the push request originates from App 1 of the first cluster 310. App 1 uses an implicit broadcast to make the request, meaning only those applications that can receive an implicit broadcast will directly receive the request. In this example, Apps 2, 3, and 4 receive the request because they target SDK 25 or lower have all registered to receive implicit broadcasts. However, Apps 5 and 6 do not directly receive the broadcast from App 1 because the second cluster 330 targets SDK 26 or higher and cannot register for implicit broadcasts.

When Apps 3 and 4 of the bridge cluster 320 receive the broadcast, they can resend the request using both the first and second versions of P2P synchronization. In this example, they can send an update command to Apps 5 and 6 using the P2P provider. Apps 5 and 6 can include manifests that register the P2P provider. This allows Apps 3 and 4 of the bridge cluster 320 to communicate with Apps 5 and 6. As a result, the push request originating as a broadcast from App 1 is synchronized with Apps 5 and 6 as an update request from Apps 3 and 4.

Figure 3C:
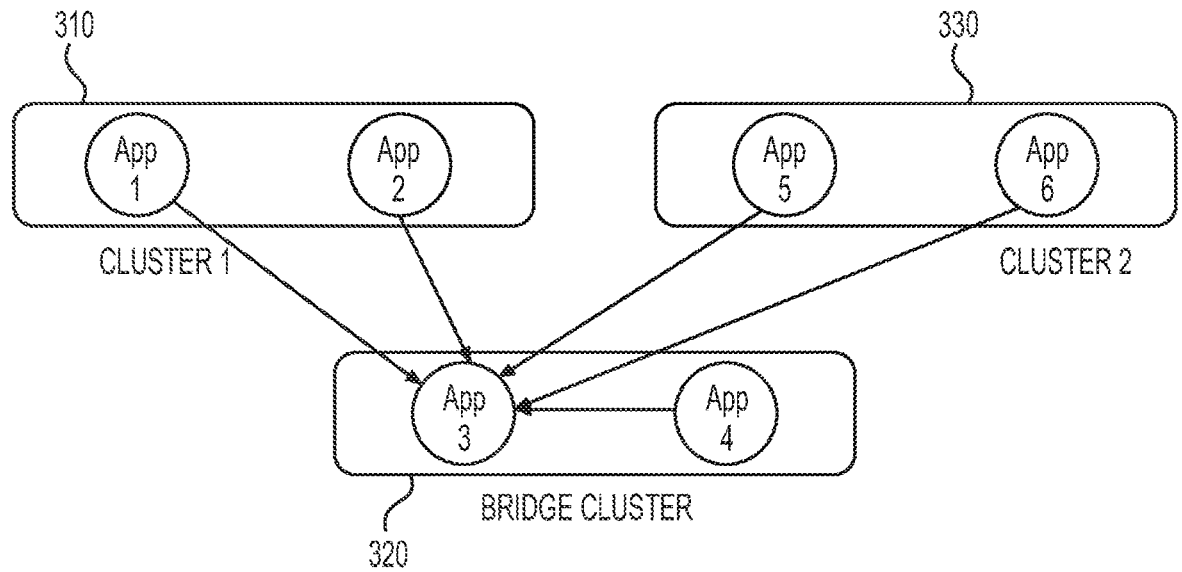
FIG. 3C is an exemplary illustration of synchronization between application clusters.

FIG. 3C is an example illustration of a pull request made by App 3 of the bridge cluster 320. App 3 can broadcast the pull request to Apps 1 and 2 of the first cluster 310. App 3 can also send a query command to the P2P providers of Apps 4, 5, and 6. This can allow App 3 to synchronize with all of the apps from the first cluster 310, bridge cluster 320, and second cluster 330.

Figure 3D:
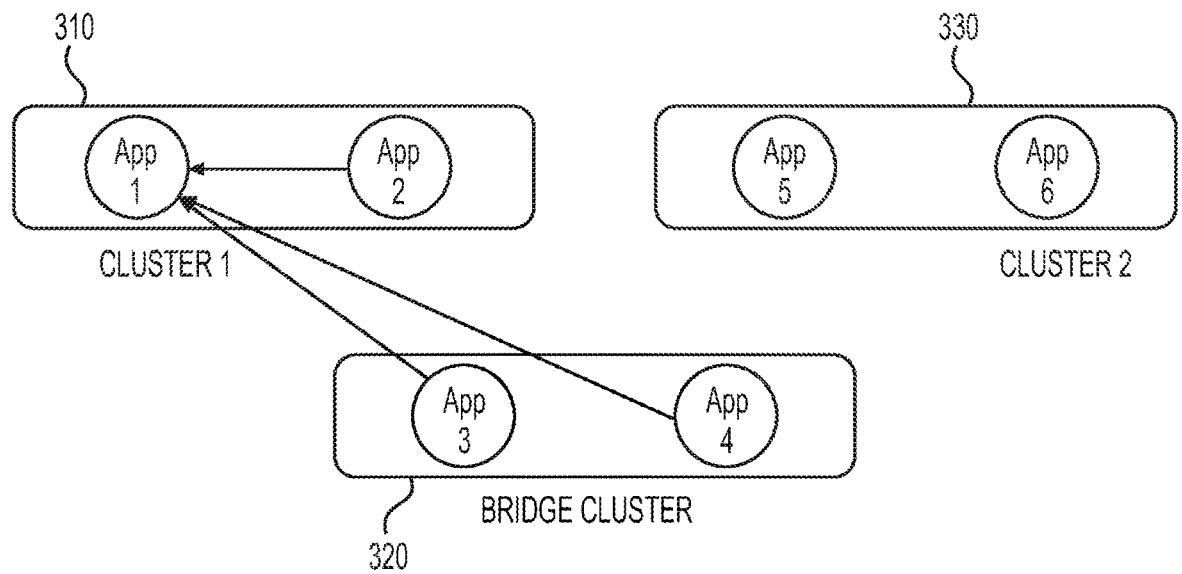
FIG. 3D is an exemplary illustration of synchronization between application clusters.

FIG. 3D is an example illustration of a pull request made by App 1 of the first cluster 310. App 1 can broadcast the request to Apps 2, 3, and 4, which have all registered to receive the broadcasts. Although App 1 cannot pull directly from Apps 5 and 6 of the second cluster 320, the data from Apps 5 and 6 can be sent from App 3 or 4. For example, because App 3 of the bridge cluster 330 already pulled data from Apps 5 and 6 as part of the pull request of FIG. 3C, the response of App 3 in FIG. 3D can include that data. In one example, App 3 can make an additional pull request, such as shown in FIG. 3C, prior to completing the query by sending data back to App 1 in FIG. 3D. This can ensure that the synchronization is backwards compatible between the first cluster 310 and second cluster 330.

Figure 4A:
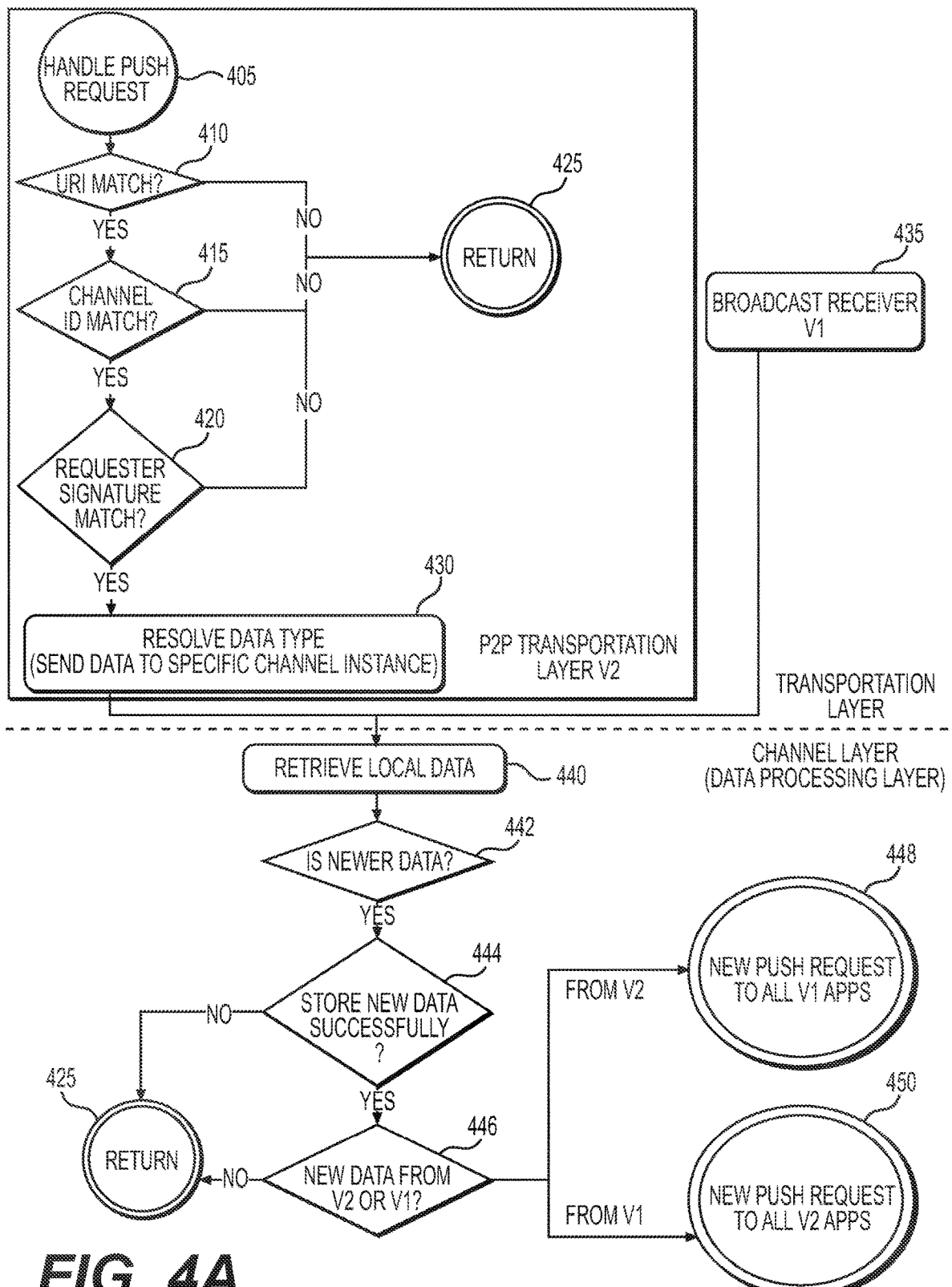
FIG. 4A is an exemplary flowchart for handling and synchronizing a push request.

FIG. 4A is an example illustration of stages performed by a P2P provider for handling a pull request. The stages of FIG. 4A can be performed by a bridge application or another application that uses content provider to synchronize. For example, the bridge application can register the P2P provider with the OS by including a string in the manifest of the bridge application. This can allow other applications to contact the bridge application using content provider commands sent to the P2P provider.

In one example, the stages in the P2P Transportation Layer V2 box are performed by the P2P provider. At stage 405, the P2P provider can receive the push request from a first application using the content provider to synchronize. For example, the first application can send a push request formatted as follows: update(URI, content values, channel ID, null).

Before merging data, the P2P provider can perform various stages to ensure that the request is trusted and should be executed. At stage 410, the P2P provider can determine if there is a URI match. The URI can specify a resource location to retrieve or update. The P2P provider can determine if the URI corresponds to a resource at the bridge application. If so, then verification can move to stage 415. If not, then the P2P provider can exit at stage 425 without updating local data of the bridge application.

At stage 415, the P2P provider can determine if a channel ID match exists. Content provider can utilize one or more of seven channels with a request. However, the P2P provider can be configured to use a particular channel for a request type. Therefore, the P2P provider can verify that the correct channel ID is being used for the request prior to proceeding any further. If the channel ID does not match the expected channel of the P2P provider, then the P2P provider can exit at stage 425 without updating local data of the bridge application.

If the channel ID does match, then the P2P provider can proceed to stage 420. At stage 420, the P2P provider can determine if the request includes a recognized signature. The signature can be used to ensure that the requesting application is associated with the same enterprise or EMM provider as the receiving application (in this example, the bridge application). Because a signature verification can be more time intensive than the URI match or channel ID match, stage 420 can occur after stages 410 and 415 in an example. If the requesting application is using the SDK specified by the EMM provider, it can send the same signature recognized by the bridge application, which can compile the same SDK.

In one example, the signature can be compared against a whitelist at the bridge application. This can allow the EMM provider to control which applications synchronize across multiple SDKs, each of which can include its own unique signature. For example, an EMM provider or enterprise can configure a P2P provider to recognize multiple keys, then specify that P2P provider in the manifest of the bridge application.

The signature can be a string specified in the P2P provider of the requesting application (in this example, the first application). Alternatively, the signature can be a key. Verification of the signature, therefore, can include determining if the P2P provider of the bridge application has access to a matching key.

If the signature matches, then the P2P provider can proceed from verification to channel-specific stages at stage 430. At stage 430, the bridge application can resolve the data type of the request. This can include performing a channel-specific action. For example, the bridge application can determine that SSO is enabled, as the channel ID can correspond to a channel that is used to synchronize between applications that utilize SSO.

The P2P provider can determine if the SDK needs to be initialized for communication on the channel. If so, the P2P provider can initialize the SDK. Other channel-specific stages can also be executed. For example, the P2P provider can unlock a database needed to fulfill the request. The P2P can determine which database to unlock based on the URI of the request, in one example.

Stage 435 illustrates an alternate scenario involving a request that is received at the broadcast receiver of the bridge application. For example, a second application targeting SDK 25 or below can broadcast a push request. Because the bridge application has registered a receiver with the OS, it can receive the implicit broadcast at stage 435.

After stages 430 and 435, the bridge application can determine whether the request should be synchronized. Similar stages can be applied to the request, whether it is received from the P2P provider or the broadcast receiver, in an example.

At stage 440, the bridge application can retrieve local data. This can be done in one example to ensure that the data sent from the first application is not outdated before performing the update. The bridge application can locate a local resource implicated by the push request, such as data in a table. In one example, the URI can specify the resource location. Alternatively, the URI identifies a P2P channel that contains identification of the resource to update. In still another example, the request can implicate a type of information that the bridge application interprets and locates.

At stage 442, the bridge application can verify that the request data is newer than existing local data before updating in response to the push request. For example, the push request data can have a date and time stamp. Similarly, the local data can have a date and time stamp. If the local data is more recent than the date and time of the pushed data, then the request can be ignored.

Otherwise, at stage 444, the bridge application can store the data by performing the update. The new data can be indicated by the content values portion of the push request, in an example.

If data storage was successful, then at stage 446 the bridge application can determine whether to synchronize the request with a different application cluster. This can include determining whether the data is redundant by comparing the request with a buffer of prior requests. The determination can also or alternatively rely on the time stamp comparison of stage 442, since old data can be ignored and not synchronized.

If the data is new, then the bridge application can send the push request to a different application cluster. For example, at stage 448, if the request was from the P2P provider (using SDK version 2), then the bridge application can synchronize with a second application by implicit broadcast. The second application can be registered with the OS to receive the broadcast. In one example, this can allow the second application and the bridge application to synchronize the request with a second cluster of applications targeting SDK 25 or below even though the request originated from a first application targeting SDK 25 or above.

Similarly, if the request originates from the broadcast receiver, then at stage 450 the push request can be sent to a P2P provider of the first application. The first application can register the P2P provider with the OS. The bridge application's P2P provider can receive names and addresses of the other registered P2P providers, including that of the first application. Then, at stage 450, the bridge application can send a push request formatted as an update command to the first application. This can synchronize the first application, targeting an SDK of 26 or greater, even though the request originated from the second application, targeting an SDK of 25 or below. In this way, a request originating in a second cluster can synchronize a first cluster of applications.

Figure 4B:
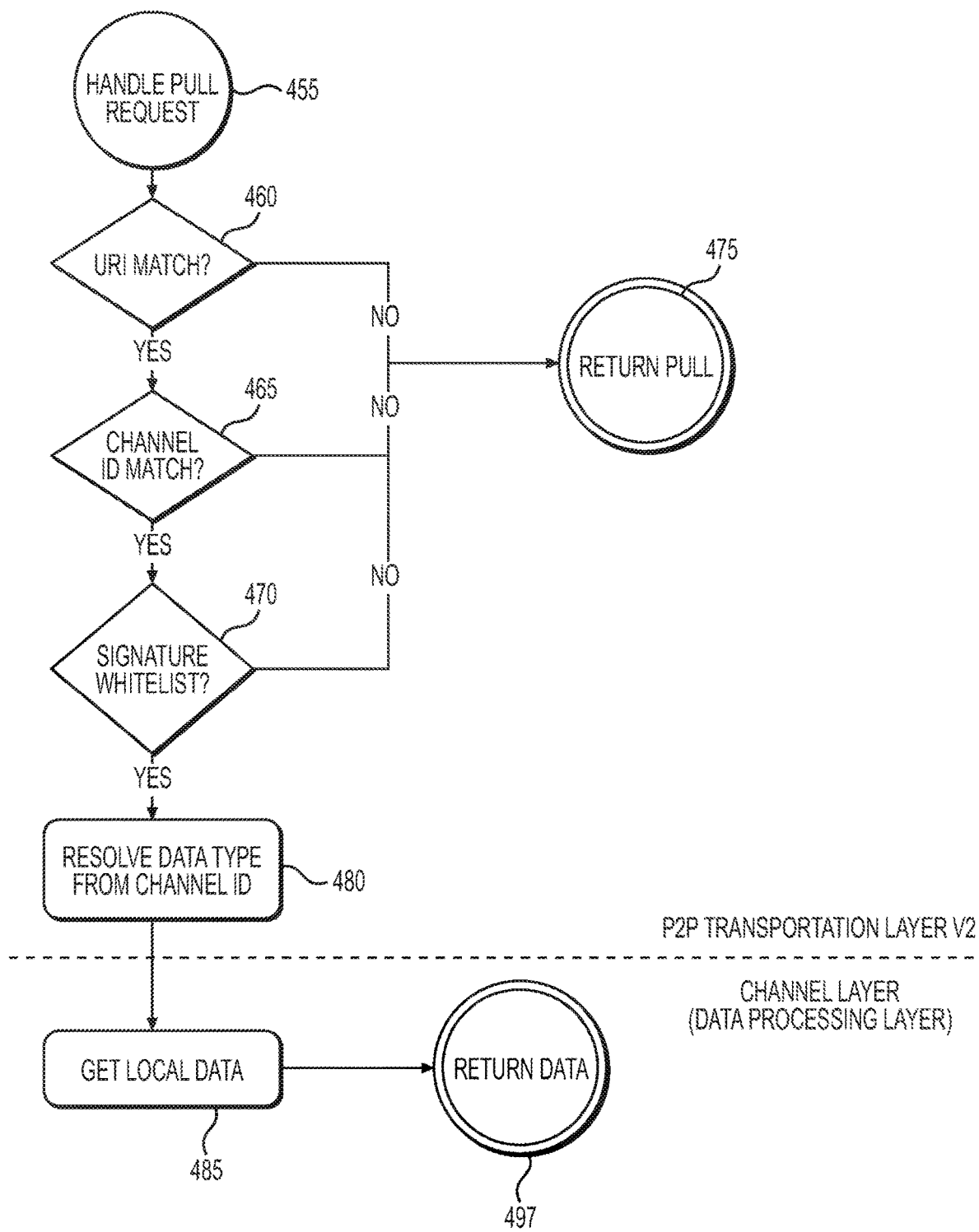
FIG. 4B is an exemplary flowchart for handling and synchronizing a pull request.

FIG. 4B is an example illustration of stages performed by a bridge application to handle a pull request. In one example, the P2P provider registered by the bridge application performs the stages of the P2P Transportation Layer V2. The bridge application itself can perform the local data operations of the Channel Layer.

At stage 455, the pull request can be sent by the first application to the bridge application's P2P provider. The pull request can be a query command in content provider, formatted as follows: query(URI, null, channel ID, null, null).

The P2P provider can verify the pull request using similar stages to those described in FIG. 4A for the push request. For example, at stage 460, the P2P provider can verify a URI match. At stage 465, the P2P provider can verify a channel ID match. At stage 470, the P2P provider can verify a signature match. If any of these verifications fail, the P2P provider can exit by returning a null value at stage 475.

Otherwise, the P2P provider can execute channel-specific tasks at stage 480. For example, the P2P provider can determine if the SDK needs initialization on the channel and can verify that SSO is enabled. Then the channel can resolve what data type is being pulled based in part on the channel ID.

At stage 485, the P2P provider can execute the query and retrieve the local data from the resource identified by the pull request. The P2P provider can ensure that the request is new before returning the requested data. To do this, the P2P provider can compare a timestamp of the pull request to a timestamp of the local data. If the local data is more recent than the pull request, then the P2P provider can return null at stage 475. Otherwise, the queried data is returned at stage 497.

The bridge application can also synchronize the pull request with a second application that targets SDK 25 or below. After determining the request is new and nonredundant, the bridge application can broadcast a pull request that is received by the second application. The second application can have a receiver registered with the OS to receive implicit broadcasts. In one example, the bridge application can perform a broadcast between stages 485 and 497. This can allow the bridge application to pull data from the second application cluster before returning data to the first application, which can be part of the first application cluster.

Figure 5:
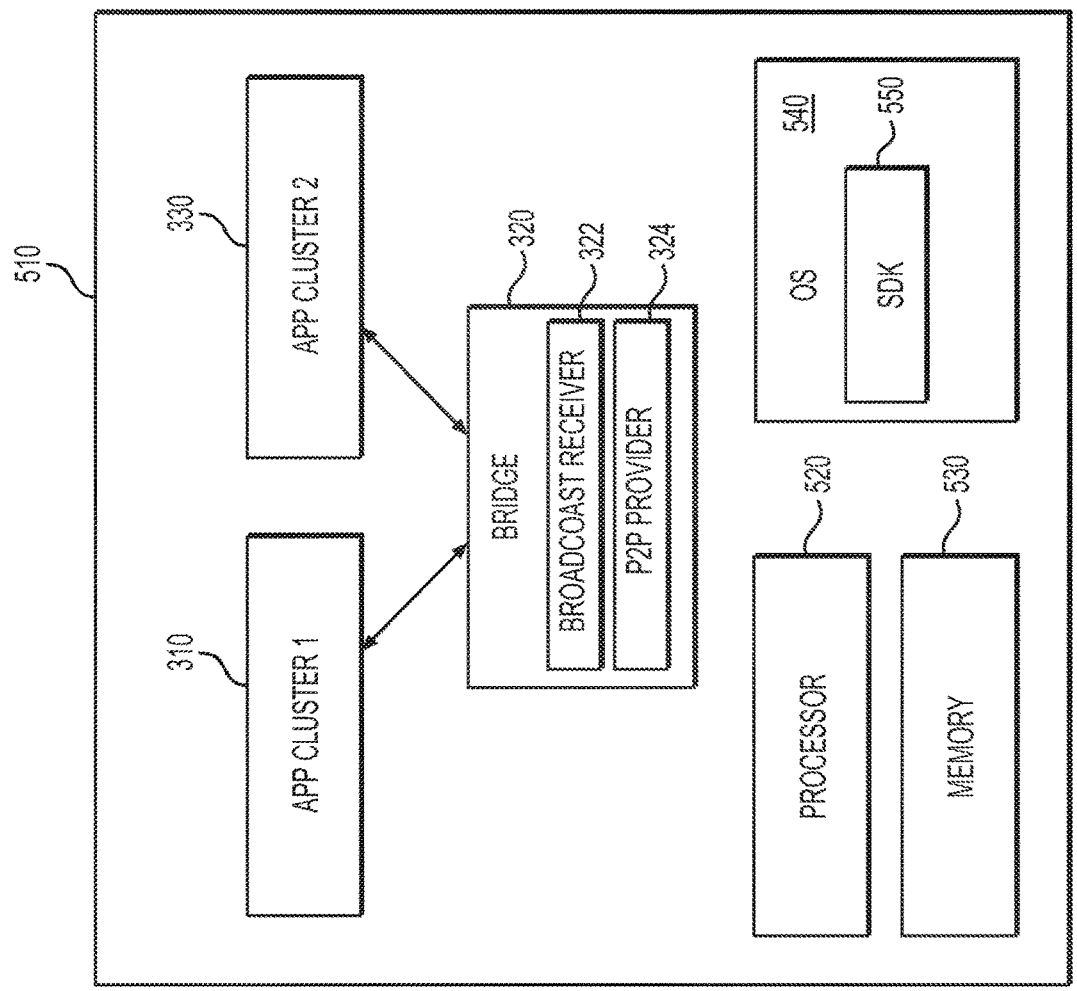
FIG. 5 is an exemplary illustration of system components.

FIG. 5 is an example illustration of components of a device 510 for performing synchronization between application clusters. The device can be any physical processor-enabled device, such as a phone, laptop, or personal computer. The processor 520 can be one or more processors that interact with instructions in a non-transitory, computer-readable medium, such as memory 530. Memory 530 is a physical memory, such as RAM or a disk drive.

Various applications can execute on the device 510. For example, the first application cluster 310, second application cluster 330, and bridge applications 320 can all execute on the device 510. The clusters of applications, for purposes of this disclosure, can be based on the targeted SDK 550. As discussed above, the SDK targeted can impact which applications can talk to one another. Applications of the first cluster 310 can all communicate with each other based on a P2P provider that implements content provider. Applications of the second cluster 330 can communicate with one another based on implicit broadcasts.

The applications of the first, bridge, and second clusters 310, 320, and 330 can be provided by one or more companies. In one example, some or all of the applications 310, 320, 330 are installed on the device 510 based on enrollment of the device in an EMM system. However, an EMM system is not required for practice of examples disclosed herein.

An OS 540, such as ANDROID, can be installed on the device 510. The OS 540 can include multiple different SDKs 550, each of which can allow different functionality for the applications 310, 320, 330 that execute on the device 510. Each application 310, 320, 330 can target a specific SDK 550. In one example, the bridge applications 320 can target ANDROID SDK 25 or lower, while also compiling SDK 26 or higher. The bridge applications 320 can register a broadcast receiver 322 with the OS 540. This can allow the bridge applications to use implicit broadcasts to send and receive requests to and from the second application cluster 330. The bridge applications 320 can also register a P2P provider 324 with the OS 540. This can allow the bridge applications 320 to use content provider functions to communicate with the first application cluster 310.

The example of SDK 25 and below versus SDK 26 and above is exemplary and the invention applies to other contexts. The examples can apply to other operating systems in addition to ANDROID. Additionally, different versions of ANDROID can impose different restrictions on the SDKs used or available. In addition, the described techniques of the bridge application 320 can be used even when implicit broadcasts are used to communicate between applications 310 and 330. For example, even when the first and second clusters 310 and 330 can each register to receive implicit broadcasts, the second cluster 330 might instead register a P2P provider. In that instance, the bridge application 320 can facilitate synchronization between the two clusters 310 and 330. Therefore, the examples can be useful even when two application clusters 310 and 330 target the same SDK.

The bridge applications 320 can have other purposes besides just facilitating synchronization between disparate application clusters 310 and 330. For example, the bridge applications 320 can be enterprise applications, such as an email client or word processing application. In other words, the bridge applications 320 can include applications that a user would install for normal work or entertainment purposes. But these bridge applications 320 can ensure reverse compatibility for synchronization between newer applications targeting SDK 26 and above and older applications targeting SDK 25 and below.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for synchronizing between applications that target different software development kits ("SDK") of an operating system ("OS"), comprising:
    registering with the OS at least:
        a peer-to-peer ("P2P") provider of a bridge application, wherein the P2P provider facilitates communications on a P2P channel; and
        a receiver that receives implicit broadcasts;
    receiving, at the bridge application, a request from a first application, wherein the first application targets a first SDK that disallows registration for receiving implicit broadcasts; and
    synchronizing the request by broadcasting to a second application that targets a second SDK that allows registration for implicit broadcasts.

2. The method of claim 1, wherein the bridge application verifies a signature of the request prior to synchronizing the request.

3. The method of claim 1, wherein the bridge application checks that the request is non-redundant prior to synchronizing the request.

4. The method of claim 1, wherein the request is a push request, and wherein the bridge application updates its data in response to the push request.

5. The method of claim 1, further comprising verifying a uniform resource indicator ("URI") and channel ID prior to synchronizing the request.

6. The method of claim 1, wherein the bridge application includes a manifest that targets the second SDK but also compiles the first SDK.

7. The method of claim 1, further comprising:
    receiving an implicit broadcast at the bridge application from the second application; and
    sending a second request to a P2P provider of the first application to carry out a command.

8. A non-transitory, computer-readable medium comprising instructions that, when executed by a processor, perform stages for synchronizing between applications that target different software development kits ("SDK"), the stages comprising:
    registering with the OS at least:
        a peer-to-peer ("P2P") provider of a bridge application, wherein the P2P provider facilitates communications on a P2P channel; and
        a receiver that receives implicit broadcasts;
    receiving, at the bridge application, a request from a first application, wherein the first application targets a first SDK that disallows registration for receiving implicit broadcasts; and
    synchronizing the request by broadcasting to a second application that targets a second SDK that allows registration for implicit broadcasts.

9. The non-transitory, computer-readable medium of claim 8, wherein the bridge application verifies a signature of the request prior to synchronizing the request.

10. The non-transitory, computer-readable medium of claim 8, wherein the bridge application checks that the request is non-redundant prior to synchronizing the request.

11. The non-transitory, computer-readable medium of claim 8, wherein the request is a push request, and wherein the bridge application updates its data in response to the push request.

12. The non-transitory, computer-readable medium of claim 8, the stages further comprising verifying a uniform resource indicator ("URI") and channel ID prior to synchronizing the request.

13. The non-transitory, computer-readable medium of claim 8, wherein the bridge application includes a manifest that targets the second SDK but also compiles the first SDK.

14. The non-transitory, computer-readable medium of claim 8, the stages further comprising:
    receiving an implicit broadcast at the bridge application from the second application; and
    sending a second request to a P2P provider of the first application to carry out a command.

15. A system for synchronizing application clusters that target different software development kits ("SDK"), comprising:
    a memory storage including a non-transitory, computer-readable medium comprising instructions; and
    a processor that executes the instructions to carry out stages of a bridge application, the stages comprising:
        registering with the OS at least:
            a peer-to-peer ("P2P") provider of the bridge application, wherein the P2P provider facilitates communications on a P2P channel; and
            a receiver that receives implicit broadcasts;
        receiving, at the bridge application, a request from a first application, wherein the first application targets a first SDK that disallows registration for receiving implicit broadcasts; and
        synchronizing the request by broadcasting to a second application that targets a second SDK that allows registration for implicit broadcasts.

16. The system of claim 15, wherein the bridge application verifies a signature of the request prior to synchronizing the request.

17. The system of claim 15, wherein the bridge application checks that the request is non-redundant prior to synchronizing the request.

18. The system of claim 15, wherein the request is a push request, and wherein the bridge application updates its data in response to the push request.

19. The system of claim 15, wherein the bridge application includes a manifest that targets the second SDK but also compiles the first SDK.

20. The system of claim 15, the stages further comprising:
    receiving an implicit broadcast at the bridge application from the second application; and
    sending a second request to a P2P provider of the first application to carry out a command.

* * * * *